United States Patent
Hoover et al.

(10) Patent No.: US 7,210,346 B1
(45) Date of Patent: May 1, 2007

(54) MODULAR SENSING APPARATUS

(75) Inventors: William S. Hoover, Plain City, OH (US); Ian N. Bentley, New Ipswich, NH (US); Louis J. Panagotopulos, Walpole, MA (US)

(73) Assignee: Honeywell International Inc., Morristown, NJ (US)

( * ) Notice: Subject to any disclaimer, the term of this patent is extended or adjusted under 35 U.S.C. 154(b) by 15 days.

(21) Appl. No.: 11/316,040

(22) Filed: Dec. 21, 2005

(51) Int. Cl.
*G01D 21/02* (2006.01)
(52) U.S. Cl. .............................. 73/431; 73/714; 73/715
(58) Field of Classification Search .................. 73/714, 73/715, 431
See application file for complete search history.

(56) References Cited

U.S. PATENT DOCUMENTS

| | | | |
|---|---|---|---|
| 4,794,048 A | 12/1988 | Oboodi et al. ............... 428/432 |
| 4,974,117 A | 11/1990 | Irwin ......................... 361/283 |
| 4,997,698 A | 3/1991 | Oboodi et al. ............... 428/209 |
| 5,070,732 A * | 12/1991 | Duncan et al. ................ 73/431 |
| 5,499,158 A | 3/1996 | Bishop et al. ............ 361/283.4 |
| 5,525,280 A | 6/1996 | Shukla et al. .................. 264/59 |
| 5,544,399 A | 8/1996 | Bishop et al. .............. 29/25.41 |
| 6,091,022 A | 7/2000 | Bodin ........................ 174/52.5 |
| 6,209,398 B1 | 4/2001 | Fowler, Jr. et al. ........... 73/724 |
| 6,528,340 B2 | 3/2003 | Haji-Sheikh et al. ......... 438/53 |
| 2006/0092042 A1* | 5/2006 | Davis et al. ........... 340/870.01 |
| 2006/0254369 A1* | 11/2006 | Yoon et al. ............ 73/862.041 |

* cited by examiner

*Primary Examiner*—Andre J. Allen
(74) *Attorney, Agent, or Firm*—Kermit D. Lopez; Luis M. Ortiz

(57) ABSTRACT

A modular sensing apparatus includes a sensing diaphragm that accommodates a particular pressure range. A pressure port can be connected to the sensing diaphragm to provide pressure data thereof. Additionally, the modular sensing apparatus includes a connector and a temperature sensor pre-selected by a user, such that the connector is attached to a pressure port. An integrated circuit can be configured to provide a desired output for respective pressure and temperature from the sensing diaphragm and the temperatures sensor and to provide error corrections thereof. The sensing diaphragm, the temperature sensor, the integrated circuit and the connector are electrically connected utilizing flexible circuitry to form the modular sensing apparatus assembled to at least one requirement of the user in order to provide simultaneous and application independent pressure and temperature sensing data.

20 Claims, 4 Drawing Sheets

MODULAR SENSING APPARATUS

TECHNICAL FIELD

Embodiments are generally related to sensing devices and methods thereof. Embodiments are also related to pressure transducers. Embodiments are additionally related to pressure and temperature sensors.

BACKGROUND OF THE INVENTION

Pressure and temperature sensors are utilized in a variety of commercial, consumer and industrial applications. Pressure and temperature transducers are well-know sensing devices. One type of pressure transducer, for example, is a device formed with a silicon substrate and an epitaxial layer, which is grown on the substrate. A portion of the substrate can then be removed, leaving a thin, flexible diaphragm portion. Sensing components can be located in the diaphragm portion to form a pressure transducer. In operation, at least one surface of the diaphragm can be exposed to a process pressure.

In a pressure and/or temperature pressure-sensing configuration, a diaphragm deflects according to the magnitude of the pressure, and this deflection bends the attached sensing components. Bending of the diaphragm creates a change in the resistance value of the sensing components, which can be reflected as a change in the output voltage signal of a resistive bridge formed at least partially by the sensing components.

Some techniques for forming a composite diaphragm for a pressure transducer or similar device involve configuring a substrate layer having a first conductivity type, wherein the substrate layer includes a first surface. Positive implants can then be deposited in the first surface of the substrate layer, and an epitaxial layer grown on the first surface of the substrate layer so that the positive implants form positive diffusions in the epitaxial layer. An oxide pattern can be then formed on the epitaxial layer, and a top layer deposited over the epitaxial layer and oxide pattern. The substrate layer and positive diffusions of the epitaxial layer can then be etched to form the composite diaphragm. Such a composite diaphragm can therefore be provided for use in a pressure sensor or like device. The diaphragm comprises a first layer of silicon nitride and a second layer attached to the silicon nitride layer and comprising a pressure sensor pattern of silicon material.

Pressure transducers of the type which comprise a thin, relatively flexible diaphragm portion of suitable material, such as silicon or ceramic, on which either a selected resistive element or a capacitive plate is printed whereby exposure to a pressure source causes deflection of the diaphragm will cause a change in the resistive value of the resistive element or a change in the spacing of the capacitive plate with a mating capacitive plate and concomitantly a change in capacitance are therefore well known in the art.

When used as a low-pressure sensor, for example, economical packaging of the transducer in a housing so that an effective seal is obtained while at the same time preventing stress related to the mounting and sealing of the transducer from influencing the output becomes problematic. This is caused, at least in part, by the significant difference in thermal expansion between the material used to form the transducer, e.g., silicon, ceramic or the like, and the housing of plastic or the like.

A conventional sealing arrangement involves placement of a ring of sealing material around an inlet pressure port in a housing and mounting the transducer so that the pressure sensitive diaphragm is precisely aligned with the pressure port. This conventional arrangement not only involves stress isolation issues, it also limits flexibility in design choices in defining the location of the transducer within the package.

Typical sensors utilized to measure both temperature and pressure simultaneously are limited by the manner in which the pressure sensing technology utilized is attached to the pressure connection or port. An internal seal or gasket is typically utilized to seal the connection, but such components limit the burst pressure of the sensor to approximately three to five times the operating range.

Another difficulty cause by these types of sensors is that varying seal materials are required to accommodate a wide range of sensing media. In other words, the sensor's mechanical structure must be matched to the media present in the measurement. Additionally, typical solutions offer few options for pressure and/or temperature range, usually limited to one or two options. For example, such sensors usually offer only one output type for pressure and temperatures and one type of electrical termination. Such devices offer few ports for pressure and/or temperature connections. If something other than these standard options is desired, then a special sensor must be constructing, adding time and costs to the construction of the sensor.

Based on the foregoing it is believed that what is need to overcome the aforementioned problems is the development of an improved pressure and temperature sensing device that allows a number of varying options without requiring special sensor configurations, while accommodating a wide range of sensing media.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for a temperature and pressure sensing apparatus.

It is yet another aspect of the present invention to provide for a modular sensing apparatus.

The aforementioned aspects and other objectives and advantages can now be achieved as described herein. A modular sensing apparatus is disclosed, which includes a sensing diaphragm that accommodates a particular pressure range. One or more pressure ports are generally connected to the sensing diaphragm to provide pressure data thereof. Additionally, the modular sensing apparatus includes a connector and a temperature sensor pre-selected by a user, such that the connector is attached to one or more of the pressure ports. An integrated circuit (e.g., ASIC) can be configured (e.g., pre-programmed) to provide a desired output for respective pressure and temperature from the sensing diaphragm and the temperatures sensor and to provide error corrections thereof. The sensing diaphragm, the temperature sensor, the integrated circuit and the connector are electrically connected utilizing flexible circuitry to form the modular sensing apparatus assembled to at least one requirement of the user in order to provide simultaneous and application independent pressure and temperature sensing data.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
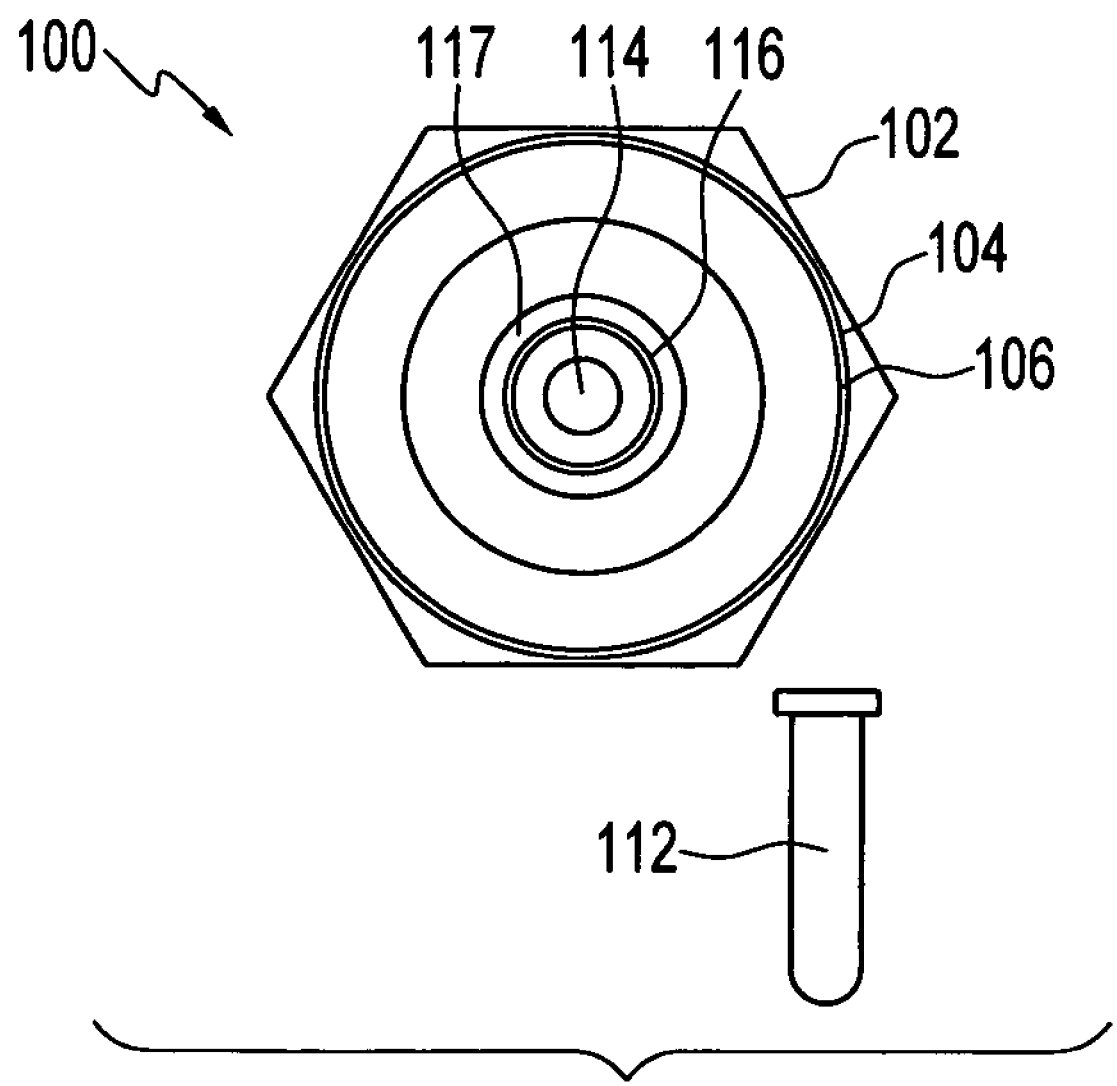
FIG. 1 illustrates a top view of a pressure port in accordance with an embodiment.
Figure 2:
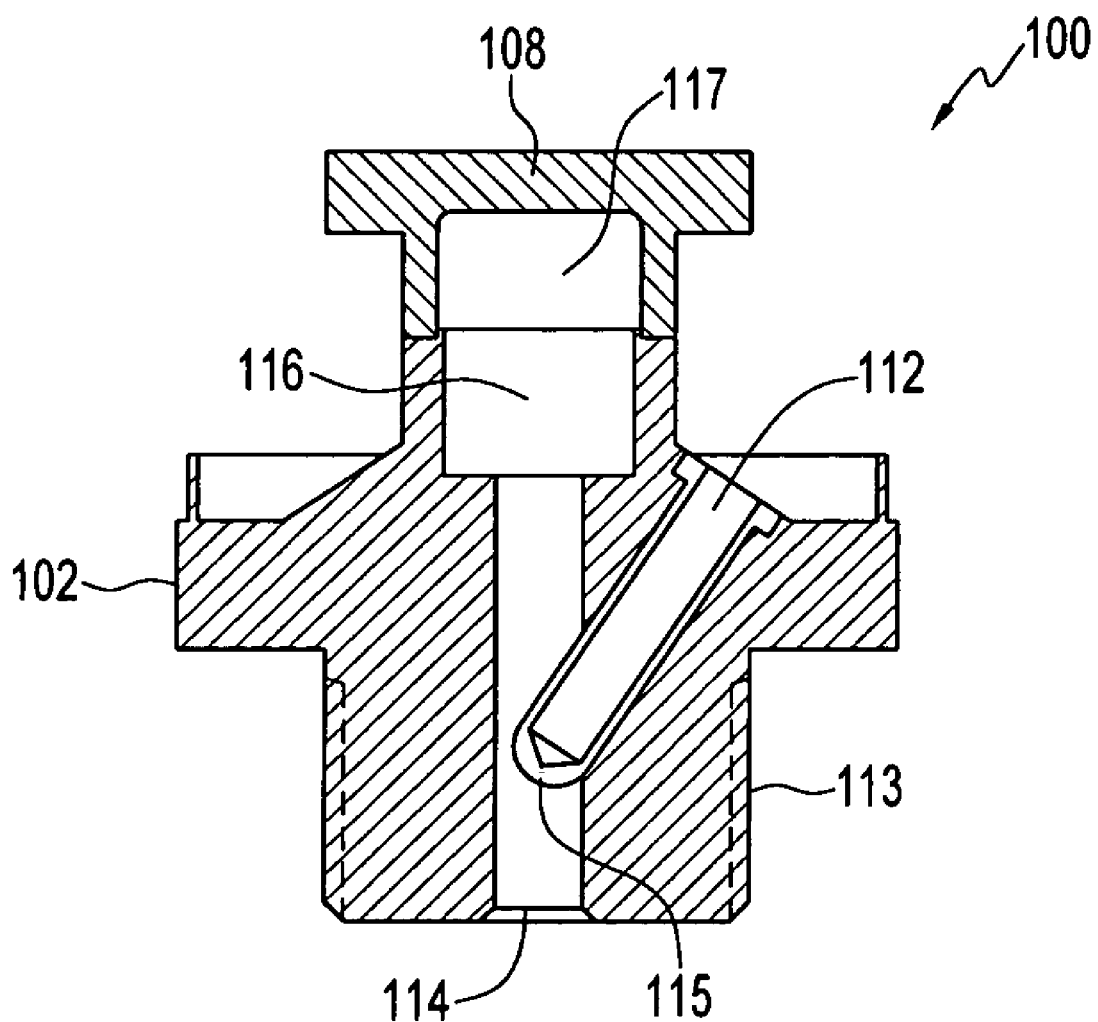
FIG. 2 illustrates a side view of the pressure port depicted in FIG. 1 in accordance with an embodiment, in addition with a pressure port with a sensing diaphragm attached.

FIG. 1 illustrates a top view of a configuration for a pressure port 100, which can be implemented in accordance with an embodiment. FIG. 2 illustrates a side view of the pressure port 100 depicted in FIG. 1. Note that in FIGS. 1–2, identical or similar parts or elements are generally indicated by identical reference numerals. Pressure port 100 generally includes components 102, 104, 106, 114, 116 and 117, which represent features on the single machined pressure port 100. Pressure port 100 can utilize a thermo or thermistor well 112. A sensing diaphragm 108 is also included in association with pressure port 100, but is not a part of the pressure port 100.

A passage 114 can also be provided, which permits pressure media to enter the pressure port 100 and come into contact with the sensing diaphragm 108 depicted in FIG. 2. The thermo or thermistor well 112 can be provided as a drilled feature that is dropped into a drilled hole 115 in the pressure port 100 at an angle and passes partially into the passage 114. The component 112 is shown in FIG. 1 separate from the pressure port 100, while in FIG. 2 the component 112 is shown as dropped into the drilled hole 115 in the pressure port and bonded therein (e.g., welding, brazing, etc.). Component 112 can be provided in the form of a cup or closed end tube that is bonded into passage 114 in the pressure port 100, and can be used to install a thermistor. Note that in FIG. 2, port mounting threads 113 are also depicted, which can vary from application to application.

Figure 3:
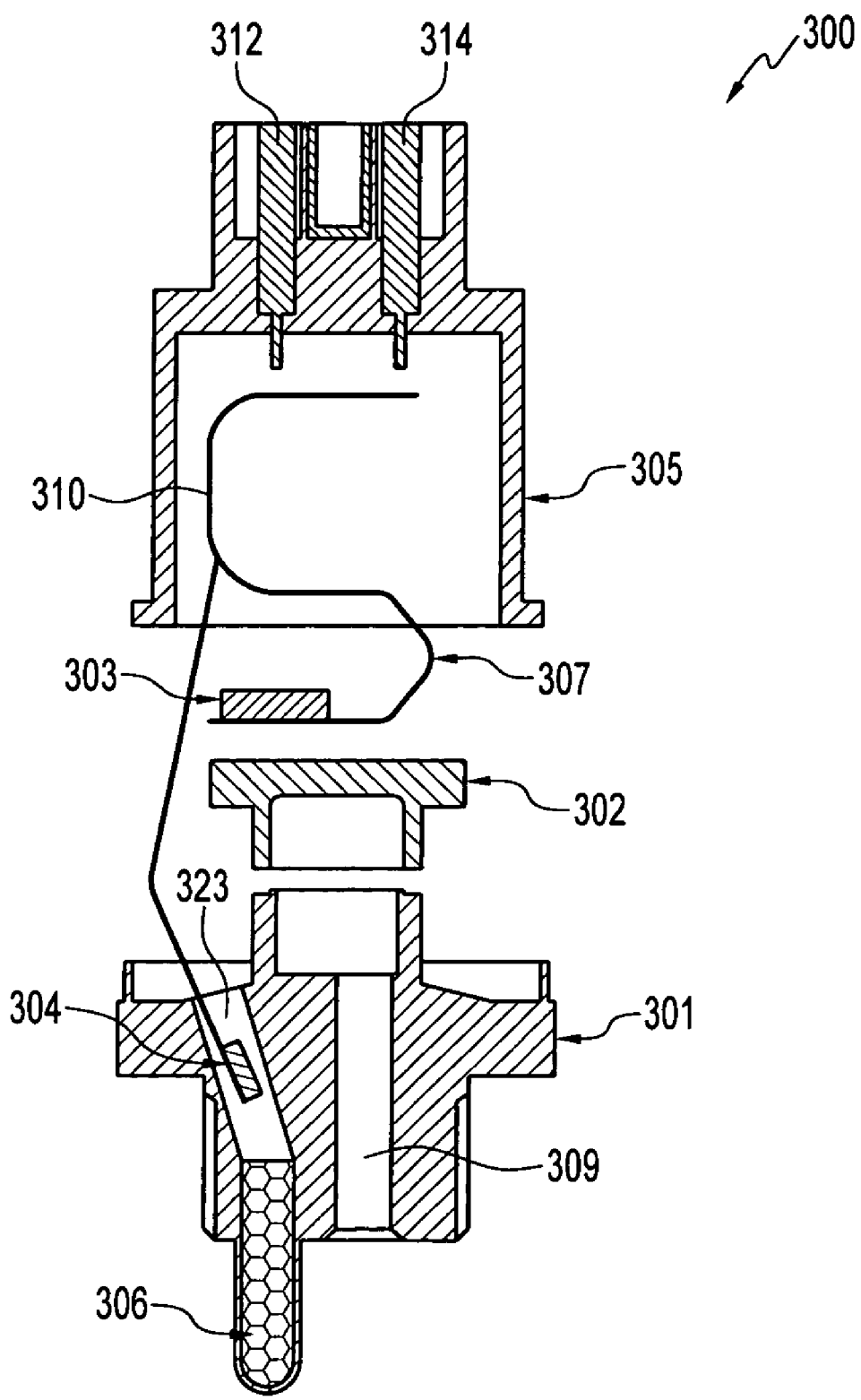
FIG. 3 illustrates a cut-away side view of modular sensing apparatus, which can be implemented in accordance with a preferred embodiment.

FIG. 3 illustrates a cut-away side view of a modular sensing apparatus 300, which can be implemented in accordance with a preferred embodiment. The modular sensing apparatus 300 generally includes a pressure port 301 that can be pre-selected by a user. Pressure port 301 is generally implemented per a particular user specification. A sensing diaphragm 302 is also provided, which accommodates a particular pressure range. The pressure port 301 is generally connected to the sensing diaphragm 302 to provide pressure data thereof. In this manner, the pressure sensing technology is bonded to the sensing diaphragm 302. Note that the sensing diaphragm 302 depicted in FIG. 3 is similar to the sensing diaphragm 108 depicted in FIGS. 1–2. The pressure port 301 depicted in FIG. 3 is also similar to the pressure port 100 depicted in FIGS. 1–2, albeit with a different structure and configuration.

A connector 305 is also provided by modular sensing apparatus 300. The connector 305 is generally compatible with a power supply (e.g., see voltage 414 depicted in FIG. 4) and data acquisition equipment. A temperature sensor 304 (e.g., thermistor) can also be provided by modular sensing apparatus 300. The temperature sensor 304 is pre-selected or requested by a user as part of the modular aspects of sensing apparatus 300. Temperature sensor 304 can include, but is not limited to components such as, for example, thermistors, thermocouples, platinum RTD's, diodes and so forth. Virtually any type of temperature sensing device can be utilized to implement temperature sensor 304, provided that the sensing device fits within a component 323 within modular sensing apparatus 300. Not that the component 323 can be configured as a hole in the port 301. The well is actually the thin walled portion protruding from the port bottom that is filled with the potting (i.e., thermally conductive material) 306.

The port 301 and the sensing diaphragm 302 are generally welded together. Temperature sensor 304 can be connected to flexible circuitry 307 and potted into temperature sensing well 3623 utilizing a material 306 that offers a high thermal conductivity and a low electrical conductivity. Examples of material 306 include but are not limited to the following: epoxy, sand, glass beads, and forth. Modular sensing apparatus 600 also incorporates the use of an ASIC 303. Additionally, components 307 and 310 are essentially pointing to the same component, which is a flex circuit. Pins 312 and 314 can be provided as pins that are integral to the connector. In other words, pins 312, 314 do not need to be treated as components to the sensor.

Note that the term ASIC as utilized herein refers generally to an "Application-Specific Integrated Circuit," which is a type of integrated circuit designed for a particular application (as opposed to integrated circuits that control functions such as memory in a computer or other data-processing apparatus. ASICs are constructed by connecting existing circuit building blocks in new manners. Because such building blocks typically already exist in, for example, a library, it is much easier to produce a new ASIC than to design a new chip from scratch.

An electrical connection can be made between the sensing diaphragm 302, the temperature sensor 304, an ASIC 303 and connector 305 utilizing flexible circuitry 307. The connector 305 is generally attached to the port 301 to finish the assembly of modular sensing apparatus 300, which can then be calibrated and tested for output type and error correction. Additionally, a passage 309 can be provided, which is analogous to the passage 114 depicted in FIG. 2. Passage 309 allows pressure media to move up into the passage 309 in order to come into contact with the sensing diaphragm 302.

Figure 4:
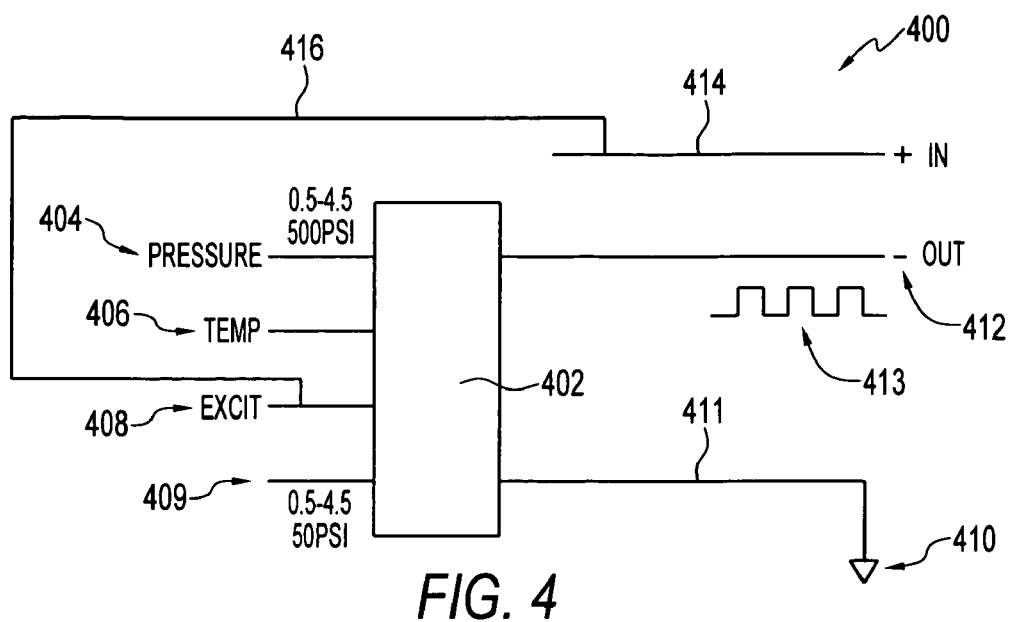
FIG. 4 illustrates an electrical schematic diagram of a pressure and temperature sensing circuit, which can be implemented in accordance with a preferred embodiment.

FIG. 4 illustrates an electrical schematic diagram of a pressure and temperature sensing circuit 400, which can be implemented in accordance with a preferred embodiment. Note that in FIGS. 4–6, identical or similar parts or elements are generally indicated by identical reference numerals. Circuit 400 generally includes an ASIC 402 having one or more input lines 404, 406, 408, 409 for respectively receiving pressure temperature and/or excitation signals. Input lie 409, for example, can also receive pressure signals (e.g., 0.5–4.5, 50 PSI), which are input to the ASIC 402. The input line 404, on the other hand, can provide a pressure input signal of, for example, 0.5 to 4.5, 500 PSI in some embodiments, depending upon design considerations. Note that the. ASIC 402 also can include output lines 412 and 411. The output line 412, for example, can generate a pulse signal 413 and the output line 411 can be connected to a ground 410. Additionally, a line 416 can be connected to the input line 408 and to a voltage 414 to which a voltage such as, for example, +5 Volts can be supplied.

Figure 5:
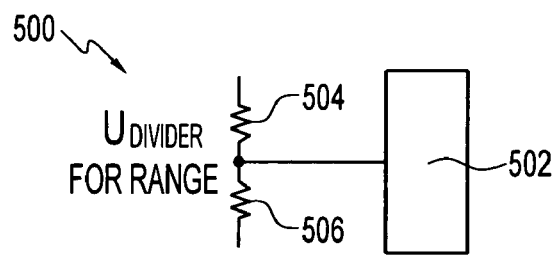
FIG. 5 illustrates an electrical schematic diagram of a circuit that can be implemented in accordance with a preferred embodiment.

FIG. 5 illustrates an electrical schematic diagram of a circuit 500 that can be implemented in accordance with a preferred embodiment. Circuit 500 includes two resistors 504 and 506 connected to one another in series. Additionally, circuit 500 can include a circuit component 502, which can be, for example, an ASIC, such as ASIC 402 depicted in FIG. 4. The circuit 500 can be implemented in association with circuit 400 depicted in FIG. 5 or may simply be provided as a standalone circuit of a larger circuit configuration, depending upon design considerations.

Figure 6:
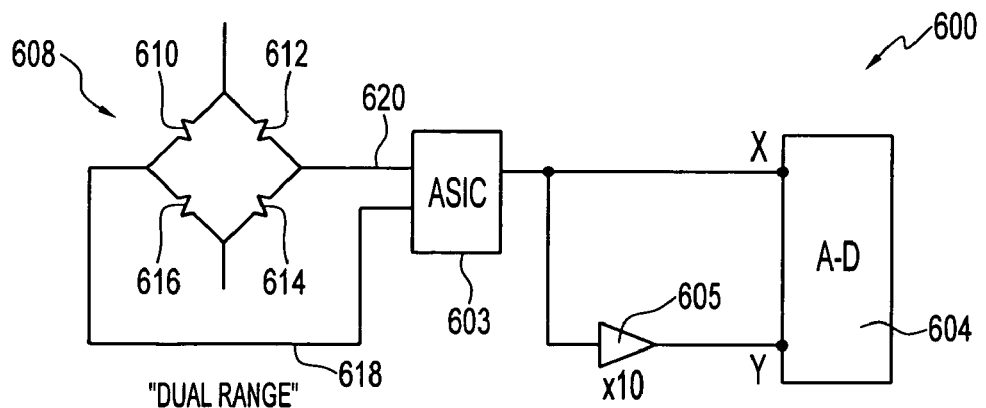
FIG. 6 illustrates an electrical schematic diagram of a circuit that can be implemented in accordance with a preferred embodiment.

FIG. 6 illustrates an electrical schematic diagram of a circuit 600 that can be implemented in accordance with a preferred embodiment. Circuit 600 generally incorporates ASIC 603, which can be connected to a resistor group 608 of resistors 610, 612, 614, and 616 via electrical lines 618 and 620 and to an Analog-to-Digital (A-D) converter 602. An amplifier 605 can also be connected to ASIC 603 and A-D converter 602. Thus, a signal output from ASIC 603 can be input to amplifier 604, which amplifies the signal and then generates an output signal that is input to A-D converter 602 at node Y. The signal output from ASIC 603 can also be transmitted to the A-D converter at node X. Note that ASIC 603 depicted in FIG. 6 is analogous to SIC 402 depicted in FIG. 4.

Based on the foregoing, it can be appreciated that the disclosed modular sensor apparatus along with the components depicted in FIGS. 1–6 provides a modular construction that can be immediately assembled to the requirements of a user (e.g., a customer). Such a design is more robust than prior art designs because it does not require any internal seals that need to be matched to the sensing application at hand. Basic elements of the design include, for example, one or more pressure ports 301, a sensing diaphragm(s) 302, connector(s) 305, a temperature sensor 304 and an ASIC 603. The diaphragm 302, the port 301, connector 305 and temperature sensor 304 can be selected to meet test requirements and are generally assembled together with the ASIC 603.

The ASIC 603 may be programmed to provide the desired output for pressure and temperature and to provide error corrections. The added robustness of the modular sensor apparatus can be achieved by sealing the port 301 to the sensing diaphragm 302 with a weld. This eliminates the use of an internal seal, which is common with prior art configurations, and because all wetted parts are constructed from a highly corrosion resistant metal, a large amount of sensing media can be accommodated. The weld can also, provide, for example, the added burst pressure of 10×, compared to 3× and 5× afforded by internal seal rings.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A modular sensing apparatus, comprising:
   a sensing diaphragm that accommodates a particular pressure range, wherein at least one pressure port is pre-selected by a user and connected to said sensing diaphragm to provide pressure data thereof;
   a connector and a temperature sensor pre-selected by said user, wherein said connector is attached to said at least one pressure port; and
   an integrated circuit configured to provide a desired output for respective pressure and temperature from said sensing diaphragm and said temperatures sensor and to provide error corrections thereof, wherein said sensing diaphragm, said temperature sensor, said integrated circuit and said connector are electrically connected utilizing flexible circuitry to form a modular sensing apparatus assembled to at least one requirement of said user in order to provide simultaneous and application independent pressure and temperature sensing data.

2. The apparatus of claim 1 wherein said temperature sensor comprises at least one thermistor.

3. The apparatus of claim 1 wherein said temperature sensor comprises at least one thermocouple.

4. The apparatus of claim 1 wherein said temperature sensor comprises at least one platinum RTD.

5. The apparatus of claim 1 wherein said temperature sensor comprises at least on diode.

6. The apparatus of claim 1 wherein said at least one pressure port is sealed to said sensing diaphragm with a weld.

7. The apparatus of claim 1 wherein said integrated circuit comprises an application-specific integrated circuit (ASIC) that is programmed to provide said desired output.

8. The apparatus of claim 1 wherein said modular sensing apparatus is calibrated for output types and error corrections thereof following an assembly of said modular sensing apparatus.

9. The apparatus of claim 1 wherein said connector is compatible with an electrical connection to a power supply and associated data acquisition equipment.

10. A modular sensing apparatus, comprising:
    a sensing diaphragm that accommodates a particular pressure range, wherein at least one pressure port is pre-selected by a user and connected to said sensing diaphragm to provide pressure data thereof;
    a connector and a temperature sensor pre-selected by said user, wherein said connector is attached to said at least one pressure port; and
    an integrated circuit having an ASIC and configured to provide a desired output for respective pressure and temperature from said sensing diaphragm and said temperatures sensor and to provide error corrections thereof, wherein said sensing diaphragm, said temperature sensor, said ASIC and said connector are electrically connected utilizing flexible circuitry to form a modular sensing apparatus assembled to at least one requirement of said user in order to provide simultaneous and application independent pressure and temperature sensing data.

11. The apparatus of claim 10 wherein said at least one pressure port is sealed to said sensing diaphragm with a weld.

12. The apparatus of claim 10 wherein said modular sensing apparatus is calibrated for output types and error corrections thereof following an assembly of said modular sensing apparatus.

13. The apparatus of claim 10 wherein said connector is compatible with an electrical connection of a power supply and associated data acquisition equipment.

14. A modular sensing method, comprising:
providing a sensing diaphragm that accommodates a particular pressure range;
pre-selecting at least one pressure port and connecting said at least one pressure port to said sensing diaphragm to provide pressure data thereof;
pre-selecting a connector and a temperature sensor, wherein said connector is attached to said at least one pressure port;
configuring an integrated circuit to provide a desired output for respective pressure and temperature from said sensing diaphragm and said temperatures sensor and to provide error corrections thereof; and
electrically connecting said sensing diaphragm, said temperature sensor, said integrated circuit and said connector utilizing flexible circuitry to form a modular sensing apparatus thereof that is assembled to at least one requirement of a user in order to provide simultaneous and application independent pressure and temperature sensing data.

15. The method of claim 14 further comprising configuring said temperature sensor to comprises at least one of the following: a thermistor, a thermocouple, a platinum RTD or at least one diode.

16. The method of claim 14 wherein connecting said at least one pressure port to said sensing diaphragm further comprises sealing said at least one pressure port to said sensing diaphragm with a weld.

17. The method of claim 14 wherein said integrated circuit comprises an application-specific integrated circuit (ASIC) that is to provide said desired output.

18. The method of claim 14 wherein said modular sensing apparatus is calibrated for output types and error corrections thereof following an assembly of said modular sensing apparatus.

19. The method of claim 14 wherein said connector is compatible with an electrical connection of a power supply and associated data acquisition equipment.

20. The method of claim 14 wherein:
connecting said at least one pressure port to said sensing diaphragm further comprises sealing said at least one pressure port to said sensing diaphragm with a weld;
said integrated circuit comprises an application-specific integrated circuit (ASIC) that is pre-programmed to provide said desired output;
said modular sensing apparatus is calibrated for output types and error corrections thereof following an assembly of said modular sensing apparatus; and said connector is compatible with a power supply and associated data acquisition equipment.

* * * * *